United States Patent Office 2,843,495
Patented July 15, 1958

2,843,495
STABILIZATION OF ORGANIC COMPOUNDS

Joseph A. Chenicek, Bensenville, Ill., assignor to Universal Oil Products Company, Des Plaines, Ill., a corporation of Delaware No Drawing. Application November 1, 1954
Serial No. 466,210

7 Claims. (Cl. 99—163)

This invention relates to the stabilization of organic compounds which tend to deteriorate in storage, transportation and/or in use due to oxidation, polymerization and/or other reactions. More particularly, the present invention relates to a novel method of preventing and/or retarding deterioration of organic compounds by incorporating therein a mixture of particular additives.

The novel method of the present invention may be utilized for the stabilization of various organic compounds which are unstable in storage, transportation, during treatment and/or in use with the resultant formation of undesirable gum, discoloration, rancidity and/or other deleterious reaction products. Specific illustrations of organic compounds which may be treated in accordance with the present invention include motor fuel, particularly unsaturated gasoline, jet fuel, diesel fuel, mineral oil, lubricating oil, fuel oil, drying oil, greases, waxes, plastics, resins, rubber, edible fats and oils, forage crops, monomers including styrene, butadiene, isoprene, acetylenes, etc., unsaturated acids, ketones, aldehydes, alcohols, etc.

The present invention is particularly applicable to the stabilization of hydrocarbons, including motor fuel and still more particularly unsaturated gasoline as, for example, cracked gasoline, coker distillate, polymer gasoline, etc. The invention also is applicable to the treatment of substantially saturated gasolines, including aviation gasolines, which tend to undergo deterioration due to the inclusion of certain additives which decompose or otherwise render the gasoline unstable. In another embodiment the present invention may be utilized for the stabilization of mixtures of unsaturated and saturated gasolines as, for example, mixtures of cracked and straight run gasolines, etc.

The novel features of the present invention also may find particular use in the stabilization of fatty materials, including both solid and liquid. It is especially applicable to the stabilization of edible fats and oils, which may be of animal, vegetable or mineral origin and which tend to become rancid especially during long periods of storage prior to use. Typical representatives of edible fats and oils include linseed oil, menhaden oil, cod liver oil, castor oil, olive oil, rapeseed oil, coconut coil, palm oil, corn oil, sesame oil, peanut oil, babassu oil, butter, fat, lard, beef tallow, etc. It is understood that other oils and fats may be treated within the scope of the present invention, including oils and fats which previously have been subjected to various treatments, such as blowing with air, heat treatment, hydrogenation, etc.

In another embodiment the present invention may be applied to the treatment of crops by dusting or spraying in order to preserve food accessory factors such as carotene, vitamins, various fatty acids, alcohols, etc.

The particular antioxidant composition of the present invention offers numerous advantages over the use of either of the components alone. In the first place, one of the antioxidants is considerably more expensive than the other antioxidant, and it has been found that surprisingly substantially the same or improved stabilization may be effected by employing a mixture of the antioxidants as compared to the stabilization obtained when employing the more expensive antioxidant alone. It readily can be seen that this offers a very important advantage from a commercial viewpoint because it may permit the commercialization of such a mixture, whereas the use of a larger concentration of the more expensive additive may be economically unfeasible. Another important advantage to the use of the mixture is that it has a lower melting point and, therefore, may be utilized as a liquid mixture which offers some advantages in incorporating the antioxidant in the organic composition to be stabilized. Furthermore, the mixture is of increased solubility in most substrates and, therefore, may be utilized more readily for the purpose. Still further, the use of the improved mixture of the present invention has greater applicability because, as happens with many antioxidants, one is more effective in one substrate while the other may be more effective in another substrate and thus over-all improved stability is obtained in a greater variety of substrates than would be obtained with only one of the components.

In one embodiment, the present invention relates to a method of stabilizing an organic compound against deterioration which comprises incorporating therein a stabilizing amount of both a 2,4,6-trialkylphenol and a 5-hydroxycoumaran.

In a specific embodiment the present invention relates to a method of stabilizing cracked gasoline which comprises incorporating therein from about 0.0001% to about 1% by weight of an antioxidant composition comprising from about 20 to about 80% by weight of 2,6-di-tert-butyl-4-methylphenol and the remainder 2,2-dimethyl-6-tert-butyl-5-hydroxycoumaran.

In another specific embodiment, the present invention relates to a method of stabilizing fatty material against rancidity which comprises incorporating therein from about 0.0001% to about 1% by weight of an antioxidant composition comprising from about 20 to about 80% by weight of 2,6-di-tert-butyl-4-methylphenol and the remainder 2,2-dimethyl-6-tert-butyl-5-hydroxycoumaran.

In still another embodiment the present invention relates to an organic substance subject to oxidative deterioration containing a stabilizing amount of the antioxidant compositon herein set forth.

In still another embodiment the present invention relates to an antioxidant composition comprising a 2,4,6-trialkylphenol and a 5-hydroxycoumaran.

As hereinbefore set forth, the novel antioxidant composition comprises both a 2,4,6-trialkylphenol and a 5-hydroxycoumaran. A preferred 2,4,6-trialkylphenol for use in the antioxidant composition of the present invention is 2,6-di-tert-butyl-4-methylphenol. Other 2,4,6-trialkylphenols include 2,6-di-isopropyl-4-methylphenol, 2,6-di-tert-amyl-4-methylphenol, 2,6-di-tert-hexyl - 4 - methylphenol, 2,6-di-tert-heptyl - 4 - methylphenol, 2,6 - di - tert-octyl-4-methylphenol, 2,6-di-tert-nonyl - 4 - methylphenol, 2,6-di-tert-decyl-4-methylphenol, 2,6-di - tert - undecyl-4-methylphenol, 2,6-di-tert-dodecyl - 4 - methylphenol, etc., and similar compounds in which the methyl group is replaced by ethyl, propyl, butyl, amyl, hexyl, etc. Other compounds include 2,4-dimethyl-6-tert-butylphenol, 2,4-diethyl-6-tert-butylphenol, 2,4-dipropyl-6-tert-butylphenol, 2,4-diamyl-6-tert-butylphenol, 2,4-dihexyl - 6 - tert - butylphenol, 2,4-diheptyl-6-tert-butylphenol, 2,4-dioctyl-6-tert-butylphenol, etc., and similar compounds in which the tert-butyl group is replaced by isopropyl, tert-amyl, tert-hexyl, tert-heptyl, tert-octyl, tert-nonyl, tert-decyl, tert-undecyl, tert-dodecyl, etc. group. Still other compounds comprise 2,4,6 - tripropylphenol, 2,4,6 - tributylphenol, 2,4,6-triamylphenol, 2,4,6-trihexylphenol, 2,4,6-triheptylphenol, 2,4,6-trioctylphenol, etc. It is understood that a mixture of trialkylphenol compounds may be used in the antioxidant composition.

A preferred 5-hydroxycoumaran comprises 2,2-dimethyl-6-tert-butyl-5-hydroxycoumaran. Other 5-hydroxycoumarans include 2-methyl-6-tert-butyl-5-hydroxycoumaran, 2-methyl-6-sec-butyl-5-hydroxycoumaran, 2,2-dimethyl-6-sec-butyl-5-hydroxycoumaran, 2-methyl-6-isopropyl-5-hydroxycoumaran, 2,2-dimethyl-6-isopropyl-5-hydroxycoumaran, 2-methyl-6-tert-amyl-5-hydroxycoumaran, 2,2-dimethyl-6-tert-amyl-5-hydroxycoumaran, etc., 2-methyl-5-hydroxycoumaran, 2,2-dimethyl-5-hydroxycoumaran, 2-methyl-6-cyclohexyl-5-hydroxycoumaran, 2,2-dimethyl-6-cyclohexyl-5-hydroxycoumaran, 2-methyl-6-benzyl-5-hydroxycoumaran, 2,2-dimethyl-6-benzyl-5-hydroxycoumaran, etc. Other inhibitors include those in which the alkyl-substituted in the 6-position comprises a radical selected from n-propyl, n-butyl, n-amyl, etc. It is understood that a mixture of 5-hydroxycoumarans may be employed.

It is apparent that numerous compounds may be utilized in accordance with the present invention. However, all of these mixtures will not necessarily be equivalent in the same or different substrates. Furthermore, it is understood that the antioxidant composition may contain additional components, which usually will depend upon the particular substrate being treated. For example, when utilized in gasoline, various dyes, metal deactivator, antiknock agent such as tetraethyllead, iron carbonyl, etc., rust inhibitor, etc., may be employed. When used in edible fats and oils, certain acids such as citric acid, phosphoric acid, ascorbic acid, etc., may be employed. In some cases, it may be desirable to include one or more additional antioxidants in the composition.

The antioxidant composition may be utilized as such or, when desired, may be dissolved in a suitable solvent, including alcohols, aldehydes, ketones, glycols, etc. When used in food products, the solvent preferably comprises propylene glycol, glycerine, etc. When used with other additives all may be included in the antioxidant composition and the composition marketed as a mixture of manifold purposes.

The antioxidant composition will be utilized in a stabilizing amount. In general, this amount will range from about 0.0001% to about 1% by weight of the substrate. However, for certain uses the antioxidant composition may be employed in larger concentrations, which generally will not exceed about 8–10% of the substrate. For example, comparatively large concentrations of additives are used in rubber, etc.

The proportions of 2,4,6-trialkylphenol and 5-hydroxycoumaran may vary considerably depending upon the particular substrate to be treated. In general, the antioxidant composition will contain from about 20% to about 80% by weight of each of these components. These percents are based upon the 2,4,6-trialkylphenol and 5-hydroxycoumaran only and are exclusive of solvents and other components in the composition. When employed, the solvent may comprise from about 10% to about 90% of the total antioxidant composition and usually will be within the range of from about 25% to about 75% of the total antioxidant composition.

It generally is preferred to form a mixture of the 2,4,6-trialkylphenol and 5-hydroxycoumaran and to incorporate the mixture into the substrate. However, when desired, one component may be added first and the other component subsequently added to the substrate.

The following examples are introduced to illustrate further the novelty and utility of the present invention but not with the intention of unduly limiting the same.

EXAMPLE I

This example illustrates the use of additives for the stabilization of a Pennsylvania cracked gasoline having a blank or uninhibited induction period of 60 minutes. The 2,4,6-trialkylphenol of this example is 2,6-di-tert-butyl-4-methylphenol. The 5-hydroxycoumaran is 2,2-dimethyl-6-tert-butyl-5-hydroxycoumaran. The results of utilizing each of the components separately in a concentration of 50 parts per million in the gasoline and of using a 50–50 weight percent mixture of these components in a total concentration of 50 parts per million are shown in the following table:

Table I

| Antioxidant: | Induction period, minutes |
| --- | --- |
| None | 60 |
| 2,6-di-tert-butyl-4-methylphenol | 250 |
| 2,2-dimethyl-6-tert-butyl-5-hydroxycoumaran | 405 |
| 50–50 mixture of above | 395 |

It would be expected that the use of a 50–50 mixture of antioxidants would produce an induction period midway between the induction periods obtained by each component alone and thus the normally expected induction period would be 328 minutes. Surprisingly it has been found that the actual induction period obtained with the mixture is 395 minutes, thus showing a considerably higher induction than normally would be expected.

EXAMPLE II

The results of using each of the components in a concentration of 100 parts per million and a 50–50 mixture thereof in a total concentration of 100 parts per million in other samples of the same gasoline as described in Example I are shown in Table II.

Table II

| Antioxidant: | Induction period, minutes |
| --- | --- |
| None | 60 |
| 2,6-di-tert-butyl-4-methylphenol | 365 |
| 2,2-dimethyl-6-tert-butyl-5-hydroxycoumaran | 545 |
| 50–50 mixture of above | 520 |

Here again it will be noted that the expected induction period when using the 50–50 mixture would be 445 minutes. On the other hand, the actual induction period obtained through the use of the mixture is 520 minutes.

EXAMPLE III

This example illustrates the results of using the additives in lard having a normal stability of 2 hours as determined by the Swift Test. This test is described in detail in the article by A. E. King, H. L. Roschen and W. H. Irwin, which appeared in Oil and Soap, vol. X, No. 6, pages 106–109 (1933), and modified as described in the article by R. W. Reimenschneider, J. Turer and R. M. Spec, which appeared in Oil and Soap, pages 169–171, September 1943. In general, this test comprises bubbling air through a sample of the lard and determining rancidity organoleptically and by peroxide values.

The results when using 0.01% by weight of 2,6-di-tert-butyl-4-methylphenol, 0.01% by weight of 2,2-dimethyl-6-tert-butyl-5-hydroxycoumaran and of using a total of 0.01% of a mixture comprising 25% by weight of 2,6-di-tert-butyl-4-methylphenol and 75% by weight of 2,2-dimethyl-6-tert-butyl-5-hydroxy-coumaran are shown in the following table:

Table III

| Antioxidant: | Stability, hours |
| --- | --- |
| None | 2.0 |
| 2,6-di-tert-butyl-4-methylphenol | 19.5 |
| 2,2-dimethyl-6-tert-butyl-5-hydroxycoumaran | 25.0 |
| 25–75 weight percent mixture of above | 29.0 |

It will be noted that in this case the mixture actually produced better results than were obtained through the use of either additive alone in the same concentration. Normally one would expect a stability of about 23 hours from the mixture, whereas actually a stability period of 29 hours was obtained.

EXAMPLE IV

This example illustrates the use of the antioxidant composition of the present invention in the stabilization of rubber. 1.75% by weight of an antioxidant composition comprising 60% by weight of 2,4-dimethyl-6-tert-butylphenol and 40% by weight of 2-methyl-6-tert-hexyl-5-hydroxycoumaran is added to the latex resulting from the emulsion polymerization of butadiene and styrene, after which the latex is coagulated and dried. The rubber so produced will be of improved quality as to retention of color, strength, elasticity, etc.

EXAMPLE V

Paraffin wax may be stabilized against oxidative deterioration by incorporating therein 0.005% by weight of an antioxidant composition comprising 75% by weight of 2,6-di-tert-amyl-4-methylphenol and 25% by weight of 6-tert-octyl-5-hydroxy-coumaran.

I claim as my invention:

1. A method of stabilizing an organic compound selected from the group consisting of gasoline and lard against deterioration in storage which comprises incorporating therein a stabilizing amount of both a 2,4,6-trialkylphenol and a 5-hydroxycoumaran, at least one of the alkyl groups in the 2- and 6-positions of said trialkyl phenol being of branched chain configuration.

2. An organic compound selected from the group consisting of gasoline and lard subject to deterioration in storage containing a stabilizing amount of both a 2,4,6-trialkylphenol and a 5-hydroxycoumaran, at least one of the alkyl groups in the 2- and 6-positions of said trialkyl phenol being of branched chain configuration.

3. Gasoline stabilized against oxidative deterioration containing a stabilizing amount of an antioxidant composition comprising a 2,4,6-trialkylphenol and a 5-hydroxycoumaran, at least one of the alkyl groups in the 2- and 6-positions of said trialkyl phenol being of branched chain configuration.

4. Cracked gasoline containing from about 0.0001% to about 1% by weight of an antioxidant composition comprising 2,4-dimethyl-6-tert-butylphenol and 2,2-dimethyl-6-tert-butyl-5-hydroxycoumaran.

5. Cracked gasoline containing from about 0.001% to about 1% by weight of an antioxidant composition comprising 2,6-di-tert-butyl-4-methylphenol and 2,2-dimethyl-6-tert-butyl-5-hydroxycoumaran.

6. Lard subject to rancidity containing from about 0.0001% to about 1% by weight of an antioxidant composition comprising 2,6-di-tert-butyl-4-methylphenol and 2,2-dimethyl-6-tert-butyl-5-hydroxycoumaran.

7. Lard subject to rancidity containing from about 0.0001% to about 1% by weight of an antioxidant composition comprising 2,6-di-tert-butyl-4-methylphenol and 2-methyl-6-tert-butyl-5-hydroxycoumaran.

References Cited in the file of this patent

UNITED STATES PATENTS

| | | |
|---|---|---|
| 1,945,521 | Downing | Feb. 6, 1934 |
| 2,599,810 | Chenicek et al. | June 10, 1952 |
| 2,721,804 | Rosenwald | Oct. 25, 1955 |